June 16, 1942. R. MANTZ 2,286,216
PIN ELEMENT
Filed April 6, 1940 2 Sheets-Sheet 1
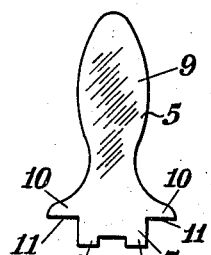
Fig. 1 Fig. 2 Fig. 3 Fig. 4
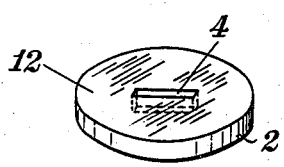
Fig. 5 Fig. 6 Fig. 7
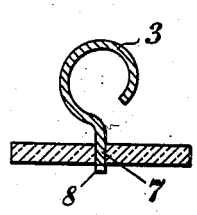 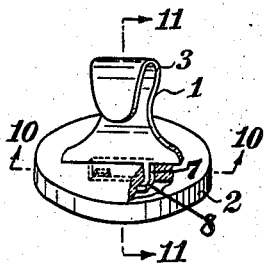 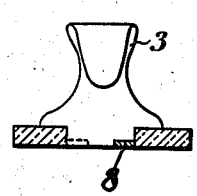
Fig. 8 Fig. 9 Fig. 10
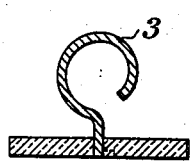
Fig. 11
INVENTOR.
Robert Mantz
BY Caesar and Rivise
ATTORNEYS June 16, 1942.  R. MANTZ  2,286,216

PIN ELEMENT

Filed April 6, 1940  2 Sheets-Sheet 2

INVENTOR.
Robert Mantz
BY Caesar and Rivise
ATTORNEYS

Patented June 16, 1942

2,286,216

UNITED STATES PATENT OFFICE 2,286,216

PIN ELEMENT

Robert Mantz, Ozone Park, N. Y., assignor to City Novelty Corporation, New York, N. Y., a corporation of New York Application April 6, 1940, Serial No. 328,297

3 Claims. (Cl. 24—150)

This invention relates to pin elements, such as the catch or the pin stem joint, which consist of a base member of Celluloid or other plastic material and a metallic member fixedly attached to said base member. The metallic member serves as a hook if the pin element is a catch and as a bearing member for the pin stem if the pin element is a pin stem joint. This invention has as its general object the production of a pin element having a new and improved structure for attaching the metallic member to the base member.

In the pin elements of the Celluloid base type now in general use, the metallic member is attached to the Celluloid base member by means of prongs which are formed on the metallic member and which are driven into the base member. These prongs are objectionable because they are sometimes bent in the act of driving with the result that they do not firmly attach the metallic member to the base member. These prongs are also objectionable because they are on the same line or extend parallel to the pin stem joint. As a result, the pin stem, when under stresses resulting in the course of wear, acts as a lever which tends to dislodge the metallic member from the base member. It is an object of this invention to produce a pin element which will be free of the foregoing objectionable features.

For the purpose of describing my invention with the particularity required by law, I have shown in the drawings which form a part hereof, and I will now describe, a catch and a pin stem joint wherein the metallic member is attached to the base member by means of my novel structure.

In said drawings, Figure 1 is a plan view of the blank from which will be formed the hook member of a catch made in accordance with my concept.

Figure 2 is a side view of the blank shown in Figure 1.

Figure 3 is a plan view of said blank as it appears after a hook has been formed therein but before it is inserted into the base of the catch.

Figure 4 is an end view of the member shown in Figure 3.

Figure 5 is a perspective view of the base member of the catch.

Figure 6 is a perspective view of the hook member in position upon the base member but before the anchoring fingers are turned to the position where they anchor the hook member to the base. A portion of the base has been broken away to more clearly show one of said anchoring fingers.

Figure 7 is a section taken along the line 7—7 of Figure 6.

Figure 8 is a section taken along the line 8—8 of Figure 6.

Figure 9 is a perspective view of a completed catch. A portion of the base member has been broken away to more clearly show one of the anchoring fingers.

Figure 10 is a section taken along the line 10—10 of Figure 9.

Figure 11 is a section taken along the line 11—11 of Figure 9.

Figure 22:
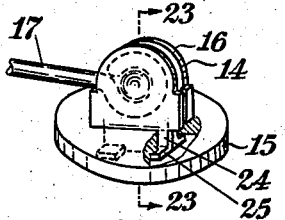

Figure 22 is a perspective view of the completed pin stem joint. A portion of the base has been broken away to more clearly show two of the anchoring fingers. A portion of the pin stem has been broken away to permit the showing of the joint on as large a scale as possible.

Figure 23:
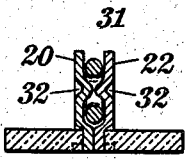

Figure 23 is a section taken along the lines 23—23 of Figure 22.

Figure 24:
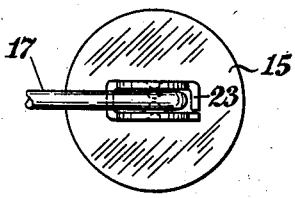

Figure 24 is a top view of the member shown in Figure 22.

Referring more particularly to the drawings, wherein similar reference numerals denote similar parts, reference numeral 1 designates the catch shown in Figures 9 to 11. The catch 1 consists of the base member 2 and the hook member 3.

The base member 2 (see Figures 5 to 11) is made of Celluloid or other plastic material and has formed therein the slot 4 which receives the foot 7 of the catch 3.

The catch 3 is formed from the blank 5 shown in Figure 1 and consists of the hook portion 6, the foot 7 and the anchoring fingers 8. The hook portion 6 is deemed to be the body element.

The catch 3 (see Figures 1 to 11) is made by first bending the arm 9 of the blank 5 in the manner necessary to cause it to form the hook portion 6 shown in Figures 3 to 11. The foot 7 of the blank 5 is then inserted into the slot 4 of the base member 2 and caused to assume the position shown in Figures 6 to 8. (In this position, the lower face 11 of each of the shoulders 10 formed in the hook member 3 contacts the upper face 12 of the base member 2, and the anchoring fingers 8 extend beyond the lower face 13 of the base member 2.) Then the anchoring fingers 8 are bent outwardly and caused to assume the position shown in Figures 9 to 11. The hook member 3 is now firmly anchored to the base member 2 and the base member 2 is firmly clamped between the shoulders 10 of the hook member 3 and the anchoring fingers 8 of said hook member.

Referring more particularly to the structure shown in Figures 12 to 24, reference numeral 14 designates the pin stem joint shown in Figures 22 to 24 inclusive. The pin stem joint 14 consists of the base member 15 and the bearing member 16 in which the pin stem 17 is rotatably mounted.

The base 15 (see Figures 18 to 24) differs from the base 2 only in the fact that the slot 18 is made big enough to snugly receive the feet 24—24 of the bearing member 16.

Figure 12:
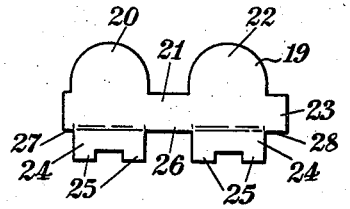
Figure 12 is a plan view of the blank from which will be formed the bearing member of a pin stem joint made in accordance with my concept.
Figure 13:
Figure 13 is an end view of said blank.
Figure 14:
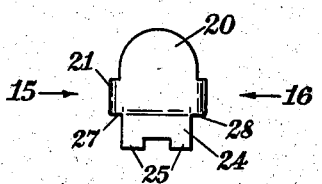
Figure 14 is a plan view of said blank after it has been shaped into the form in which it is inserted into the base member.
Figure 15:
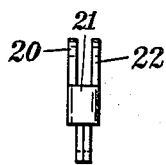
Figure 15 is an end view looking in the direction of the arrow 15.
Figure 16:
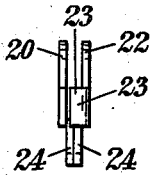
Figure 16 is an end view looking in the direction of the arrow 16.
Figure 17:
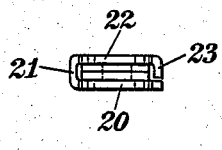
Figure 17 is a top view of the blank shown in Figure 14.
Figure 18:
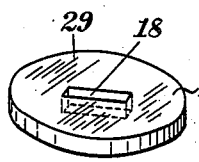
Figure 18 is a perspective view of the base member of the pin stem joint.
Figure 19:
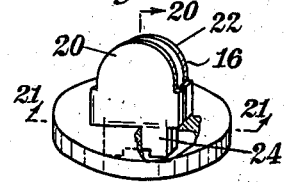
Figure 19 is a perspective view of the bearing member in position upon the base but before the anchoring fingers are turned to the position where they anchor the bearing member to the base. A portion of the base has been broken away to more clearly show two of the anchoring fingers.
Figure 20:
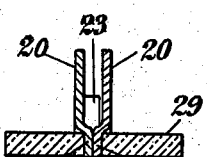
Figure 20 is a section taken along the line 20—20 of Figure 19.
Figure 21:
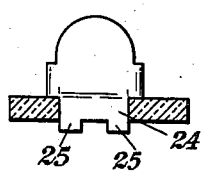
Figure 21 is a section taken along the line 21—21 of Figure 19.

The bearing member 16 (see Figures 14 to 24) is made from the blank 19 shown in Figures 12 and 13 by first bending the same into the form shown in Figures 14 to 21. (When this is done, the element 20 of the blank 19 becomes the wall 20 of the bearing member, the bridge 21 of the blank 19 becomes the bridge 21 of the bearing member, the wall 22 of the blank 19 becomes the wall 22 of the bearing member, the arm 23 of the blank 19 becomes the wall 23 of the bearing member, the feet 24—24 of the blank 19 become the feet 24—24 of the bearing member, and the fingers 25—25 of the blank 19 become the fingers 25—25 of the bearing member. The walls 20 and 22, the bridge 21, and the wall 23 are deemed to be the body portion of the bearing member 16.) The feet 24—24 of the bearing member 16 are now positioned within the slot 18 of the base member 15 and caused to assume the position shown in Figures 19 to 21. (In this position, the lower face 26 of the bridge 21 and the lower faces 27 and 28 of the wall 20 and the wall 23 contact the upper face 29 of the base member 15 and serve as shoulders for said bearing member.) The fingers 25—25 are now bent to the position shown in Figures 22 to 24 where they are flush with the lower face 30 of the base 15. The bearing member 16 is now firmly anchored in the base member 15 and the base member 15 is now securely clamped to the bearing member between the shoulders 26, 27, 28 and the fingers 25.

The pin stem 17 is then anchored in place (see Figures 22 to 24) by positioning the eye 31 thereof between the walls 20 and 22 and crimping said walls inwardly at a point over the bight of the eye. The crimping produces the protuberances 32—32 which enter the bight of the eye 31 and serve both as pivots for the pin stem and as the means for attaching the pin stem 17 to the bearing member 16.

It is clear from the foregoing disclosure that the novel pin element, whether a catch or a pin stem joint, consists of a base member of Celluloid or other plastic material and a metallic member which is fixedly attached to said base member. The metallic member consists of a body portion which is fashioned to function as a hook in the event that the pin element is a catch, and as a bearing member for the pin stem in the event that the pin element is a pin stem joint. In each case, the body portion of the metallic element terminates at the lower edge thereof in a pair of spaced-apart shoulders from which extend a foot or feet which in turn terminate in anchoring fingers. The lower face of each of the shoulders contacts the upper face of the base member. The foot or feet extend into the slot formed in the base member. The combined length of the foot or feet and their respective locking fingers are such that the lower face of the foot will not extend beyond the lower face of the base member, and the locking fingers may be turned to be flush with the lower face of said base. When finished, the shoulders, the feet, and the locking fingers serve as the means for firmly clamping the base member to the body portion of the metallic member. It is to be noted that each finger is bent at right angles to the long axis of the slot. As a result, these fingers are always at right angles to the axis of the pin stem. This plus the shoulder and foot structure counteracts the force exerted by the pin stem which tends to pull the metallic member out of the base member.

Having described my invention, what I claim as new and useful is:

1. A pin element consisting of a flat base member of plastic material and a metallic member fixedly attached to said base member; said metallic member consisting of a body portion having spaced apart shoulders formed therein at the lower edge thereof with the lower face of each of said shoulders contacting the upper face of said base member, a foot extending from said body portion at a point between said shoulders and into said slot, and anchoring fingers extending from said foot, each of said anchoring fingers bent at right angles to the long axis of said slot to be flush with the lower face of said base member, said shoulders, foot, and fingers combining to clamp said base member to said body portion.

2. A catch for a pin, said catch consisting of a flat base member of plastic material and having a slot formed therein and a metallic member fixedly attached to said base member, said metallic member consisting of a hook-like body portion having spaced apart shoulders formed therein at the lower edge thereof with the lower face of each of said shoulders contacting the upper face of said base member, a foot extending from said body portion at a point between said shoulders and into said slot, and anchoring fingers extending from said foot, each of said anchoring fingers bent at right angles to the long axis of the slot to be flush with the lower face of said base member, said shoulders, foot, and fingers combining to clamp said base member to said body portion.

3. A pin stem joint consisting of a flat base member made of plastic material and having a slot formed therein and a metallic chamber fixedly attached to said base member; said metallic member consisting of a box-like body portion having spaced apart shoulders formed therein at the lower edge thereof with the lower face of each of said shoulders contacting the upper face of said base member, a pair of feet extending from each of two opposed walls of said body portion from a point between said shoulders into the said slot, and anchoring fingers extending from each of said feet, each of said anchoring fingers bent at right angles to the long axis of said slot to be flush with the lower face of said base member, said shoulders, feet, and fingers combining to clamp said base member to said body portion.

ROBERT MANTZ.